United States Patent [19]
Hampton et al.

[11] Patent Number: 5,465,290
[45] Date of Patent: Nov. 7, 1995

[54] CONFIRMING IDENTITY OF TELEPHONE CALLER

[75] Inventors: Thomas H. Hampton, Lyme; Thomas J. Litle, IV, Nashua; Nigel H. Searle, Keene, all of N.H.

[73] Assignee: Litle & Co., Salem, N.H.

[21] Appl. No.: 168,912

[22] Filed: Dec. 16, 1993

Related U.S. Application Data

[63] Continuation of Ser. No. 675,488, Mar. 26, 1991, abandoned.

[51] Int. Cl.⁶ .......................... H04M 1/64; H04M 11/04
[52] U.S. Cl. .......................... 379/67; 379/88; 379/89; 379/97; 379/201; 379/207; 379/91; 379/95; 379/189; 379/245; 381/42
[58] Field of Search .................. 379/67, 88, 89, 379/97, 201, 207, 91, 95, 188, 189, 245; 381/42

[56] References Cited

U.S. PATENT DOCUMENTS

| | | | |
|---|---|---|---|
| 4,255,619 | 3/1981 | Saito | 379/96 |
| 4,427,848 | 1/1984 | Tsakanikas . | |
| 4,718,093 | 1/1988 | Brown | 381/43 |
| 4,922,538 | 5/1990 | Tchorzewski | 379/88 |
| 4,996,705 | 2/1991 | Entenmann et al. | 379/104 |
| 5,008,930 | 4/1991 | Gawrys et al. | 379/210 |
| 5,023,901 | 6/1991 | Sloan et al. | 379/38 |
| 5,023,904 | 6/1991 | Kaplan et al. | 379/91 |
| 5,181,238 | 1/1993 | Medamana et al. | 379/94 |
| 5,274,695 | 12/1993 | Green | 379/91 |

OTHER PUBLICATIONS

Takahashi et al., "SR-2000 Voice Processor and Its Applications", NEC Res. & Develop., No. 73, Apr., 1984, pp. 98–105.
"Nilson Report", Issue 488, Nov., 1990.
Naik, "Speaker Verification: A Tutorial", IEEE Communications Magazine, Jan., 1990, pp. 42–48.
Toigo, "Biometrics Creep into Business", Computerworld, Jun. 11, 1990, pp. 75, 76, 78.
"VCS's SpeechPrint ID™ System" and VCS Brochure, Voice Control Systems.
"Teamed for Success: NEC Digital Signal Processors and Speech Processing Devices", pp. 31–35.
Yoshida et al., "Large Vocabulary Word Recognition Based on Demi-Syllable Hidden Markov Model Using Small Amount of Training Data", IEEE Communications S1.1, 1989, pp. 1–4.
Fiderio, "Voice, Finger and Retina Scans: Can Biometrics Secure Your Shop?", Computerworld, Feb. 15, 1988, pp. 81–81–82, 86–87.
Alexander, "Biometric System Use Widening", Computerworld, Jan. 8, 1990, p. 16.

*Primary Examiner*—James L. Dwyer
*Assistant Examiner*—Fan Tsang
*Attorney, Agent, or Firm*—Fish & Richardson

[57] ABSTRACT

The invention provides a distributed information processing system for verifying the identities of telephone callers, in which data is stored in a first processing station and signal processing is performed by one or more speaker verification units located at one or more respective second, remote processing stations. The first processing station is arranged for storing data corresponding to a signature and to caller identification information for respective users. The second processing station or stations each include a speaker verification unit and a processor. The speaker verification unit is adapted for receiving, via the public telephone system, a voice and/or touch-tone signal representing a signature of a possible user, and for digitally signal processing the signal representing the signature. The processor is connected to the speaker verification unit and is adapted for connection to the first station via a telephone line between the first and second stations, programmed to receive caller identification information for the possible user and to receive a digitally processed signature signal for the possible user from the speaker verification unit, and programmed to communicate with the first station via the telephone line in order to test the signature of the possible user against the valid signature of the user corresponding to the received caller identification information.

48 Claims, 13 Drawing Sheets

CONFIRMING IDENTITY OF TELEPHONE CALLER

This is a continuation of application Ser. No. 07/675,488, filed Mar. 26, 1991, now abandoned.

BACKGROUND OF THE INVENTION

This invention relates to verifying the identities of telephone callers.

Security systems provide protection for credit card owners by reducing the possibility that an unauthorized person will successfully initiate a financial transaction using the card owner's credit card number. For example, the card owner may choose a personal identification code that serves as a password to be used in conjunction with the credit card account. When a caller attempts to initiate a financial transaction over the phone with a mail order company or similar organization, the caller may be asked to provide the personal identification code that is associated with the account. A person receiving the call at the mail order company has access to the valid personal identification code. If the caller provides an incorrect personal identification code, a freeze is placed on the credit card account, and the card holder is notified of the incident.

Similarly, a holder of an automated teller card may choose a personal identification code or a password. When a person inserts the card into an automated teller machine, the machine requests the person to punch the personal identification code or the password into a keypad on the machine. If the personal identification code or password matches the personal identification code or password of record for the bank account, the transaction is allowed to proceed. If the person at the automated teller machine does not punch in the correct personal identification code or password after a given number of attempts, the automated teller machine retains the card and the card holder is notified of the incident.

Voice processors, generally, are devices that receive speech and identify the word being spoken. Speaker verification units, generally, are voice processors that verify whether a particular password is being spoken. Such a device is used in conjunction with a database to which the speaker verification unit is attached. The database stores a set of digitized and "vectorized" passwords. The speaker verification unit digitizes the password being spoken, producing a digitized output, "vectorizes" the digitized output by transforming the digitized output into a vector of voice characteristics, and compares the digitized and vectorized output with a digitized and vectorized password selected from the database. The password being spoken may be received by the speaker verification unit over a telephone line. The speaker verification unit verifies whether the digitized and vectorized output adequately matches the digitized and vectorized password selected from the database. Some speaker verification units are unlikely to verify a match unless the person speaking happens to be a person who earlier spoke the password in order to store the password in the database.

Another type of speaker verification unit verifies whether the person speaking is a particular person, regardless of what the person is saying. The speaker verification unit extracts from the person's speech certain information characteristic of the person's speech. This information is known as the person's "voice print." A voice print is an example of a biometric signal. The speaker verification unit compares the voice print with a voice print selected from the database. The speaker verification unit verifies whether the voice print it has extracted from the person's speech sufficiently matches a voiceprint selected from the database.

One published paper, Takahashi et al., "SR-2000 Voice Processor and Its Applications," NEC Res. & Develop., No. 73, April 1984, describes a bank system or a credit card service system in which speaker verification units are located at each of a set of service areas at differing locations. The speaker verification units are remotely controlled, via data communication lines, by a system controller that is located at a central service area. A customer may call a remote service area and request information relating to a bank account or a credit card account using a service code that identifies the type of information requested, an account number that identifies the customer's account, and an identification number that identifies the customer. When a customer calls a remote service area, the speaker verification unit at that remote service area receives the call and the centrally located system controller accesses customer information from a host computer at the central service area and uses the received information to control the speaker verification unit via a data communication line while the call is in progress.

SUMMARY OF THE INVENTION

The invention provides a distributed information processing system for verifying the identities of telephone callers, in which data is stored in a first processing station, telephone calls are made to one or more second, remote processing stations, and signal processing is performed by a speaker verification unit located at each second, remote processing station. The second processing station need not communicate with the first processing station while a telephone call is in progress.

The first processing station is arranged for storing data corresponding to a signature and to caller identification information for respective users. The second processing station or stations each include a speaker verification unit and a processor. The speaker verification unit is adapted for receiving, via the public telephone system, a telephone call that includes voice and/or Touch-Tone (dual-tone multifrequency—DTMF) signal representing a signature of a possible user, and for digitally signal processing the signal representing the signature. The processor is connected to the speaker verification unit and is adapted for connection to the first station via a telephone line between the first and second stations. The processor is programmed to receive caller identification information for the possible user and to receive a digitally processed signature signal for the possible user from the speaker verification unit. The processor is also programmed to participate in a communication of signature data via a telephone line between the first and second stations prior to receipt of the telephone call at the second station or after termination of the telephone call in order to permit the signature of the possible user to be tested against the valid signature of the user corresponding to the received caller identification information.

By providing a distributed processing security system in which data is stored in a first, "central" station, signal processing is performed in one or more second, "remote" stations, and the signature of the possible user is tested against the valid signature of the user based on signature data communicated via a telephone line between the first and second stations prior to receipt of the telephone call at the second station or after termination of the telephone call, the invention eliminates the need to forward telephone calls from the second station to the first station and eliminates the need to communicate with the first station over a dial-up or dedicated telephone line during the telephone call, thereby providing low operational expense of the system.

In preferred embodiments, the processor located at the second, remote station or stations is programmed to receive the caller identification information from a digital data processing system located at the second station in a protocol compatible with the digital data processing system, and to communicate with the first station via the telephone line between the first and second stations in another protocol compatible with the first station. By providing a processor in the second, "remote" station that receives caller identification information in any of a plurality of protocols, that converts or "protocol shifts" from each of the plurality of protocols to a protocol that is compatible with the first, "central" station, and that transfers the caller identification information to the first station in a protocol compatible with the first station, the invention enables the combination of a remote speaker verification unit and a remote processor to be implemented in conjunction with a plurality of differing pre-existing digital data processing systems, at differing second, "remote" stations, that use differing protocols. The invention thereby makes the physical implementation of a distributed processing security system economically feasible.

The processor at the second, remote station or stations preferably includes a signal cache. The processor is programmed to receive from the first station data corresponding to a signature, and to store the data corresponding to the signature in the signal cache. The invention thereby enables the second station to operate for limited periods of time without access to the database of the first station, thereby increasing the efficiency of the distributed processing security system, provided that the cache of the second station and the database of the first station are updated with respect to each other periodically. In the event of a communications failure or a failure at the first station, the second station will still be able to operate.

The processor at the second, remote station or stations preferably includes a transaction database. The processor confirms authorization of the possible user to engage in a subsequent transaction by storing an authorization signal in the transaction database, if and only if the signature of the possible user matches the valid signature. The invention thereby enables the combination of the speaker verification unit and the processor that includes the database to be relatively de-coupled from a pre-existing digital data processing system at the second station. The invention consequently eliminates expense and other problems that might be inherent in implementing a distributed processing security system in which the transaction database is integrated into the pre-existing digital data processing system.

The second, remote station preferably includes a call direction unit adapted to direct the telephone call containing the signal representing the caller's signature to the speaker verification unit in a manner such that the signal is isolated from access by other persons. The invention thereby prevents unauthorized persons from obtaining access to codes or passwords.

Other advantages and features will become apparent from the following description of the preferred embodiments and from the claims.

DESCRIPTION OF THE PREFERRED EMBODIMENTS

We first briefly describe the drawings.

Drawings FIG. 1 is a block diagram of a security system according to the invention.

STRUCTURE

Figure 1:
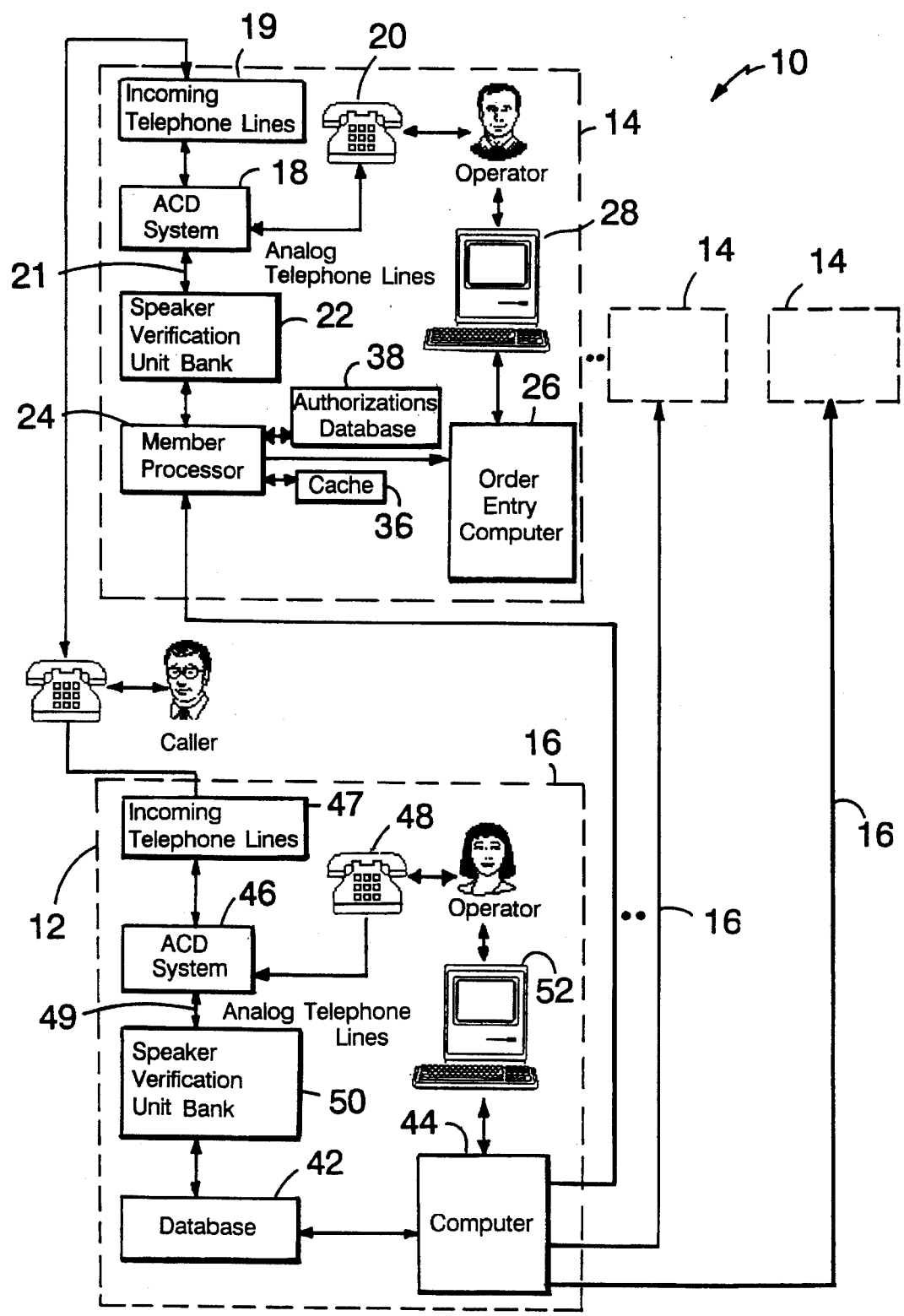

Referring to FIG. 1, a security system 10 according to the invention includes a central station 12 connected to remote stations 14 (at differing locations) via telephonic data lines 16.

Each remote station 14 (e.g., an order entry station of a mail order retail business) includes an automatic call direction system 18 that is connected to a set of incoming telephone lines 19 and that automatically directs each call to an available order entry handset in a bank of order entry handsets 20 operated by respective telephone operators (e.g., order takers) at the remote station. Each order entry handset in order entry handset bank 20 can be used to transfer a call back through automatic call direction system 18 and via an analog telephone line 21 to an available speaker verification unit in a bank of speaker verification units 22. The speaker verification units may be similar to voice processors available from Voice Control Systems of Dallas, Tex. that incorporate VCS SpeechPrint ID™ technology. Each of the speaker verification units is connected, via local area network Ethernet connections, to a member processor 24, which can transfer information between speaker verification unit bank 22 and central station 12 over dial-up or dedicated telephone line 16, which forms one of the links of a wide area network. Member processor 24 is a stand-alone computer that utilizes its own operating system such as UNIX.

Remote station 14 includes an order entry computer 26, which is connected to a bank of order entry terminals 28 operated by the telephone operators at the remote station. Member processor 24 can communicate with order entry computer 26, and can transfer data from order entry computer 26 to central station 12 over telephone line 16. Member processor 24 is programmed to be able to receive data from order entry computer 26 in any of a number of different protocols such as 3270 or LU.6, to convert or "protocol shift" from each of the different protocols to a protocol that is compatible with central station 12, and to transmit the data to the central station through a wide area network gateway in the protocol with which the central station is compatible.

Member processor 24 can also transfer data from order entry computer 26 to the bank of speaker verification units 22. The member processor has access to a cache 36 in which it can store information received from central station 12, and a transaction database 38 in which the member processor can store verification codes that verify the identities of callers, denial codes that represent transactions for which the identity of the caller can not be confirmed, error codes representing processing errors, and other information relevant to the caller, the credit card, or the caller's order.

Central station 12 includes a central database 42 and a central computer 44 that has access to central database 42 and that is connected to telephonic data line 16. Central computer 44 is connected to a bank of terminals 52 operated by respective telephone operators at the central station. Central station 12 also includes an automatic call direction system 46 that is connected to a set of incoming telephone lines 47 and that automatically directs each call to an available handset in a bank of handsets 48 operated by telephone operators at the central station. Each handset in handset bank 48 can be used to transfer a call back through automatic call direction system 46 and via an analog telephone line 49 to an available speaker verification unit in a bank of speaker verification units 50. Each speaker verification unit produces an output that is received by order entry computer 44 and stored in central database 42.

Figure 2:
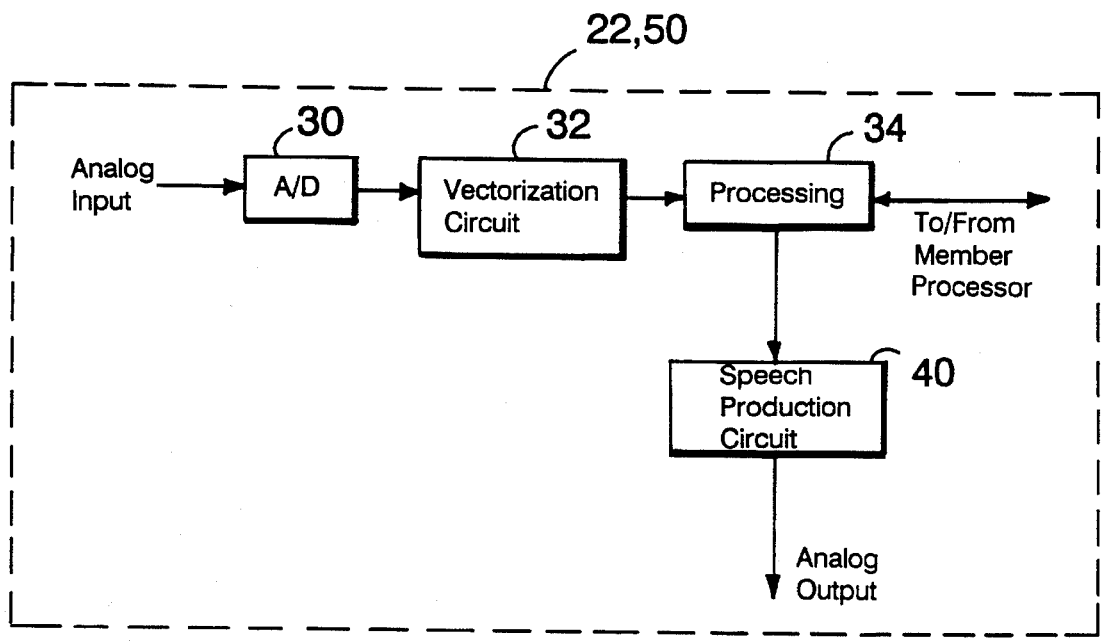
FIG. 2 is a block diagram of a speaker verification unit according to the invention.

Referring to FIG. 2, each speaker verification unit in banks of speaker verification units 22 and 50 includes an analog-to-digital converter 30, which receives an analog input signal from the automatic call direction system and produces a digitized output signal, and a vectorization circuit 32 that receives the digitized signal and "vectorizes" the digitized signal to produce discrete quantities that enable a speaker's spoken password to be distinguished from another speaker's spoken password. In an alternative embodiment, vectorization circuit 32 may produce discrete quantities that identify a "voice print" of the speaker, regardless of the word being spoken. A "voice print" is a set of characteristics of a person's speech that are peculiar to the particular person and that are difficult for others to imitate. In another alternative embodiment, the password is a set of DTMF signals rather than a spoken password, and vectorization circuit 32 extracts, from the sound of the DTMF signals, discrete quantities that identify the DTMF signals.

A processing circuit 34, which receives the discrete quantities from vectorization circuit 32, is connected to member processor 24 (FIG. 1), through which processing circuit 34 can receive password information from, and transmit password information to, the central station. Processing circuit 34 can also receive data from the order entry computer through the member processor. The processing circuit is connected to a speech production circuit 40 that talks to the caller through the automatic call direction system.

Operation

Figure 3A:
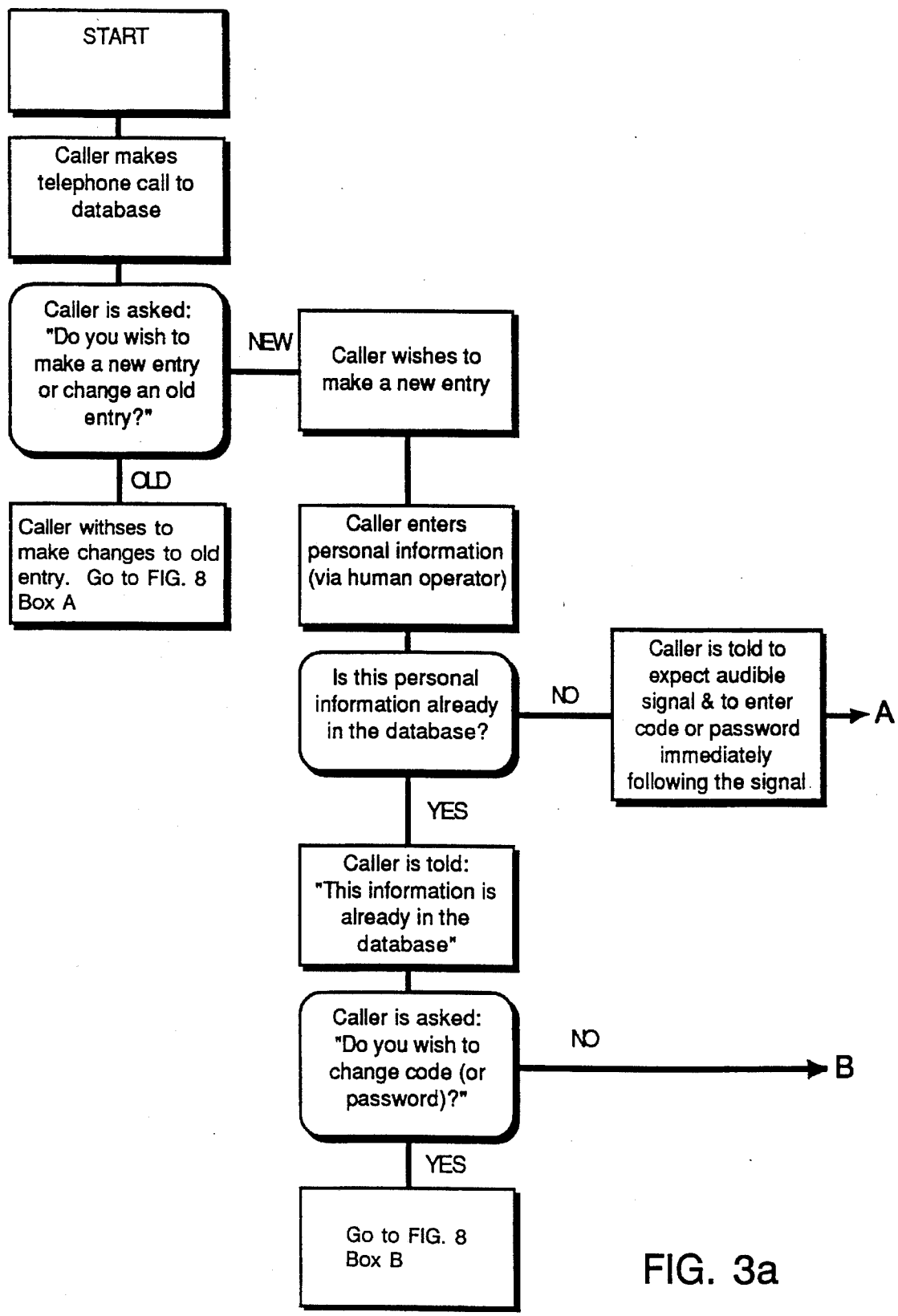
FIG. 3 is a flowchart diagram of a method according to the invention of recording caller identification information and a code or password.
Figure 3B:
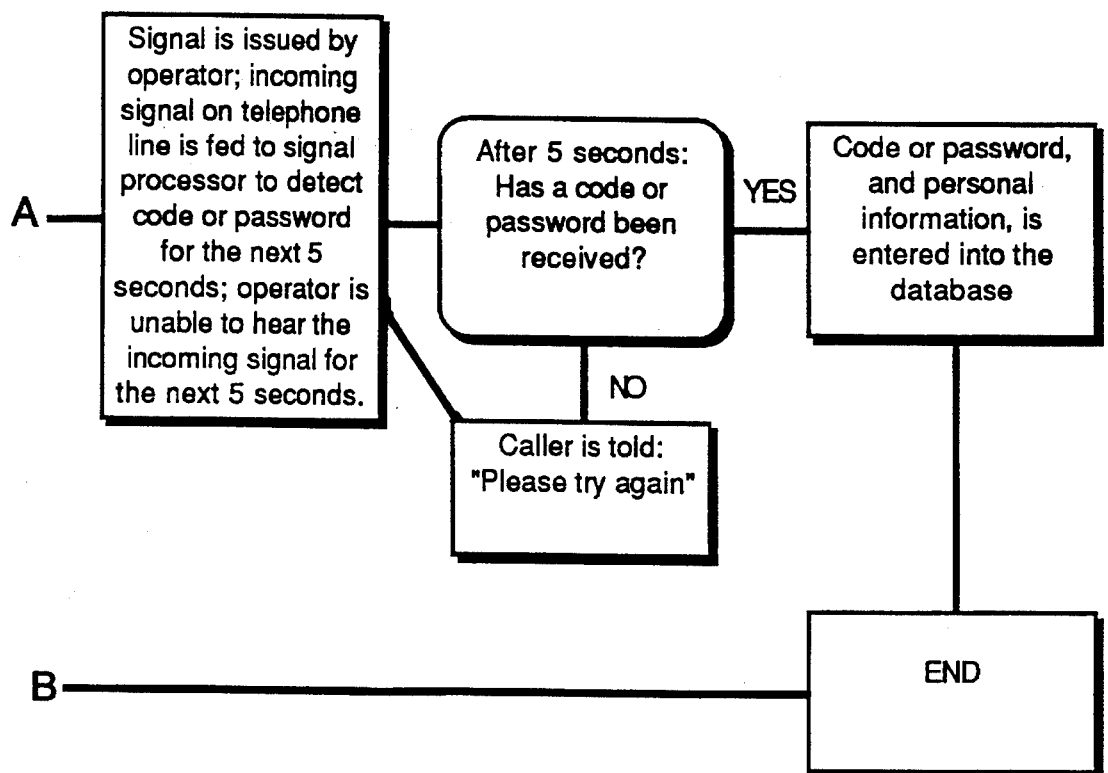

Referring to FIG. 3, when a caller telephones the central station to record caller identification information and a code or password, the automatic call direction system transfers the call to a bank of operators. One of the operators asks the caller to confirm that the caller wishes to make a new entry in the database. The caller then provides caller identification information to the operator, such as the caller's name, address, date of birth, telephone number, bank account numbers, credit card account numbers, and Social Security number. The operator enters the caller identification information into one of the terminals at the central station.

The computer at the central station determines whether the caller identification information is already stored in the central database. When the computer at the central station confirms that the caller identification information for the caller is not already stored in the central database, the operator tells the caller to expect an audible signal and to be prepared to enter a sequence of digits using the keys of a DTMF telephone, or to speak a single word, immediately following the audible signal. The operator then diverts the incoming signal through the automatic call direction system to the speaker verification unit at the central station, for a short period of time such as five seconds. At the beginning of this short period, the speaker verification unit causes an audible signal to be sent to the caller over the telephone line. During this period the operator is unable to hear the code or password that the caller transmits over the telephone line, and does not see any visual confirmation of the code or password on the screen of the workstation. The speaker verification unit digitizes and vectorizes the incoming signal and stores the digitized and vectorized signal in the database in association with the caller identification information received from the caller.

If a code or password is not received within the prescribed period of time, the speaker verification unit produces an error code, which is transmitted to the central computer. The operator may respond to the error code by giving the caller a chance to try again. The operator again diverts the incoming signal through the automatic call direction system to the speaker verification unit at the central station, and the speaker verification unit once again causes an audible signal to be sent to the caller over the telephone line to prompt the caller to provide the code or password. In an alternative embodiment, the order entry computer may respond automatically to the error code by transmitting a signal to the speaker verification unit to repeat the process, and the speech production circuit of the speaker verification unit may tell the caller to try again. The speech production circuit may also perform other tasks that might otherwise be performed by the human operator.

Although the code or password is stored immediately, the code or password is preferably not "activated" (i.e., the code or password is not available when the caller wishes to initiate a transaction) until the caller responds to some form of notification (by mail or phone at work, for example) to verify the caller's identity in some way.

The central computer updates the member processors of the various remote stations with new data from the central database on some regular basis, depending on the need for timely information, so that the member processors can in turn update the caches in which copies of the code or password information are stored, thereby enabling transactions to be processed more efficiently and even in the presence of a communications failure or a failure at the central station. Likewise, the member processor sends new caller identification information and codes and passwords back to the central database on some regular basis, or as it is received, depending on the need for timely information. Thus, in ordinary operation, a caller may telephone any remote station to record caller identification information and a code or password, and the member processor at the remote station may determine whether the caller identification is already stored in the cache at the remote station, rather than the central database, and may cause the output of the speaker verification unit to be stored in the cache, rather than the central database.

Figure 4:
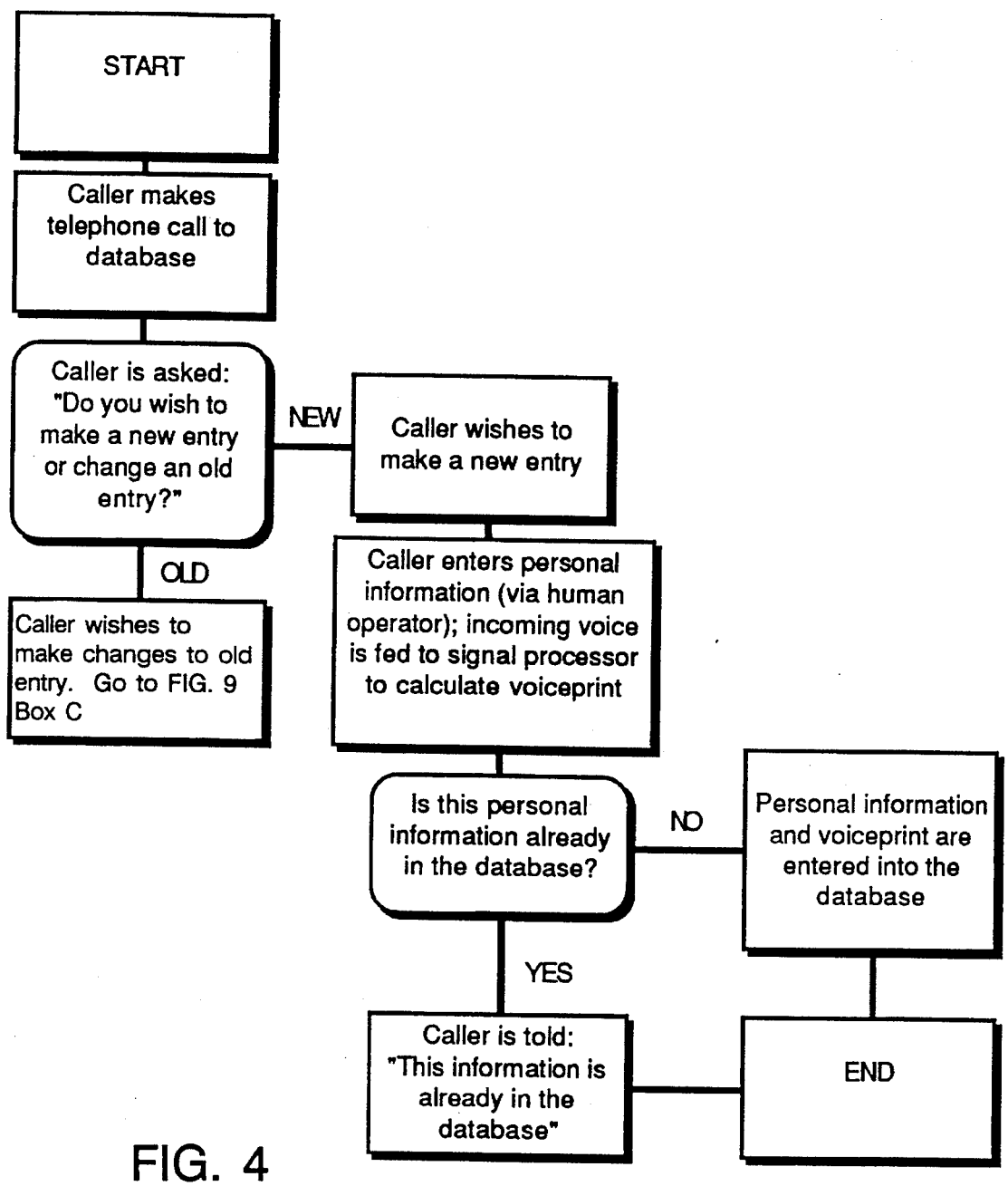
FIG. 4 is a flowchart diagram of a method according to the invention of recording caller identification information and a voice print.

Referring to FIG. 4, when a caller telephones the central station to record caller identification information and a voiceprint, rather than a code or password, the automatic call direction system transfers the call to a bank of operators. An operator asks the caller to confirm that the caller wishes to make a new entry in the database. The caller then provides caller identification information to the operator, which the operator enters into a terminal.

During this process, and while the caller is speaking, the automatic call direction system simultaneously feeds the incoming signal on the telephone line to the speaker verification unit. The speaker verification unit digitizes the signal and extracts the caller's voiceprint, a unique set of characteristics by which the caller's voice can be distinguished from the voices of other people. The computer at the central station confirms that the caller identification information is not already stored in the central database, and transmits the caller identification information that has been entered into the terminal to the central computer for storage in the central database in association with the voiceprint of the caller, which the computer receives from the speaker verification unit.

Alternatively, the caller may telephone any remote station to record caller identification information and a voiceprint, and the member processor at the remote station may confirm that the caller identification information is not already stored in the cache at the remote station, and may cause the caller identification information and voiceprint to be transmitted to the cache. The central computer and the various caches at the remote stations periodically update each other.

Although the voiceprint is stored immediately, this voiceprint is preferably not "activated" (i.e., the voiceprint is not available when the caller wishes to initiate a transaction) until the caller responds to some form of notification (by mail or phone at work, for example) to verify the caller's identity in some way.

Figure 5:
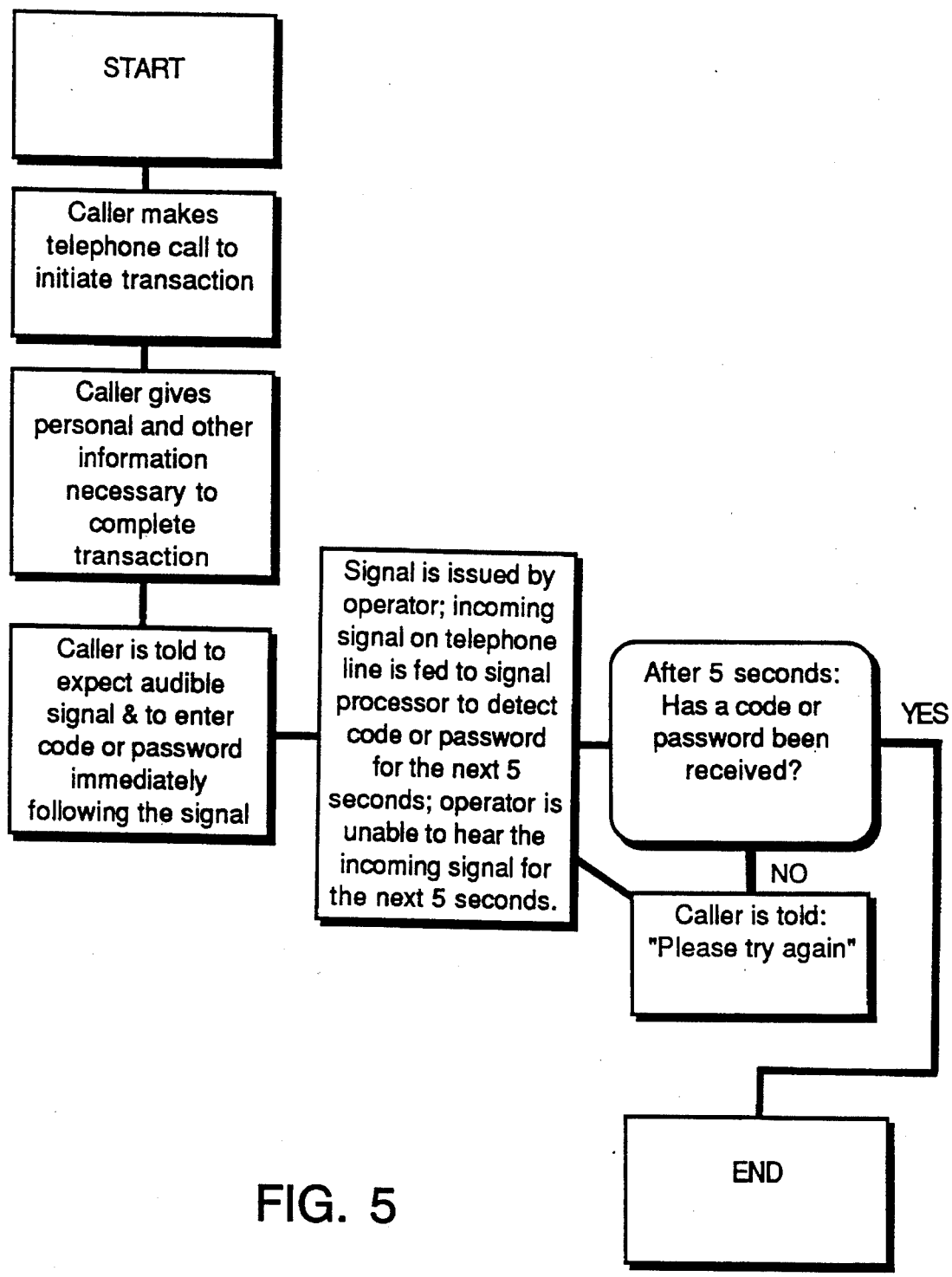
FIG. 5 is a flowchart diagram of a method according to the invention of initiating a transaction using a code or password.

Referring to FIG. 5, when a caller telephones one of the remote stations to perform a transaction (e.g., buy a product from a mail order supplier) in which a code or password is to be used for authorization, the automatic call direction system transfers the call to a bank of operators. The caller provides information necessary to complete the transaction, including caller identification information. Once the operator has entered the caller's account number into the system, the order entry computer or member processor can query the cache at the remote station to determine 1) whether the owner of that account has stored caller identification information in the central database, and 2) whether the caller has previously expressed a desire not to participate in the caller identification program, the order entry computer displaying that information on the operator's screen. Normally, the operator will transfer the call to the speaker verification unit unless the caller has previously expressed a desire not to participate.

The operator tells the caller to expect an audible signal and to be prepared to enter a sequence of DTMF digits, or to speak a single word, immediately following the signal. The operator then diverts the incoming signal through the automatic call direction system to the speaker verification unit at the remote station. The speaker verification unit causes an audible signal to be sent to the caller over the telephone line. During this period the operator is unable to hear the code or password that the caller transmits over the telephone line, and does not see any visual confirmation of the code or password on the screen of the workstation. The speaker verification unit digitizes and vectorizes the incoming signal. The digitized and vectorized signal is used in the matching process, which will be described in relation to FIG. 7.

If a code or password is not received within the prescribed period of time, or some other error occurs, the member processor stores an error code in the transaction database at the remote station. The operator or a representative of the mail order company that received the call can resolve the problem with the caller during the original call or at a later date.

The operator may enter information into the order entry terminal that pertains to a value of the transaction to be processed. The value of the transaction may determine the degree of matching necessary to confirm the identity of a caller. The order entry computer transmits the degree-of-matching information to the speaker verification unit through the member processor.

Figure 6:
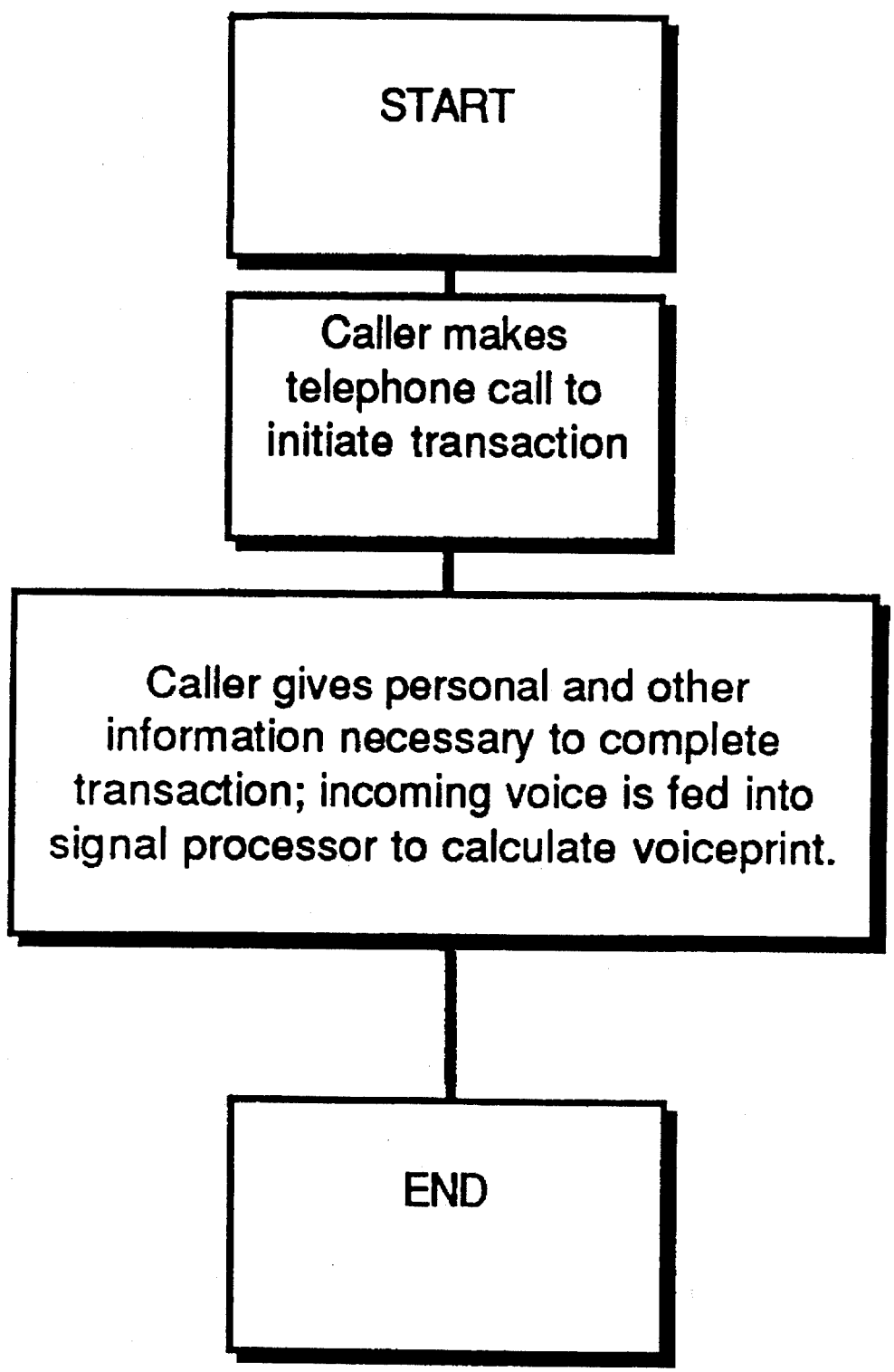
FIG. 6 is a flowchart diagram of a method according to the invention of initiating a transaction using a voice print.

Referring to FIG. 6, when a caller telephones one of the remote stations to perform a transaction in which a voiceprint is to be used for authorization, the automatic call direction system transfers the call to a bank of operators. The caller provides information necessary to complete the transaction, including caller identification information.

During this process, the automatic call direction system simultaneously feeds the incoming signal on the telephone line to the speaker verification unit. The speaker verification unit digitizes the signal and extracts the caller's voiceprint. The voiceprint is used in the matching process, which will be described in relation to FIG. 7.

Figure 7:
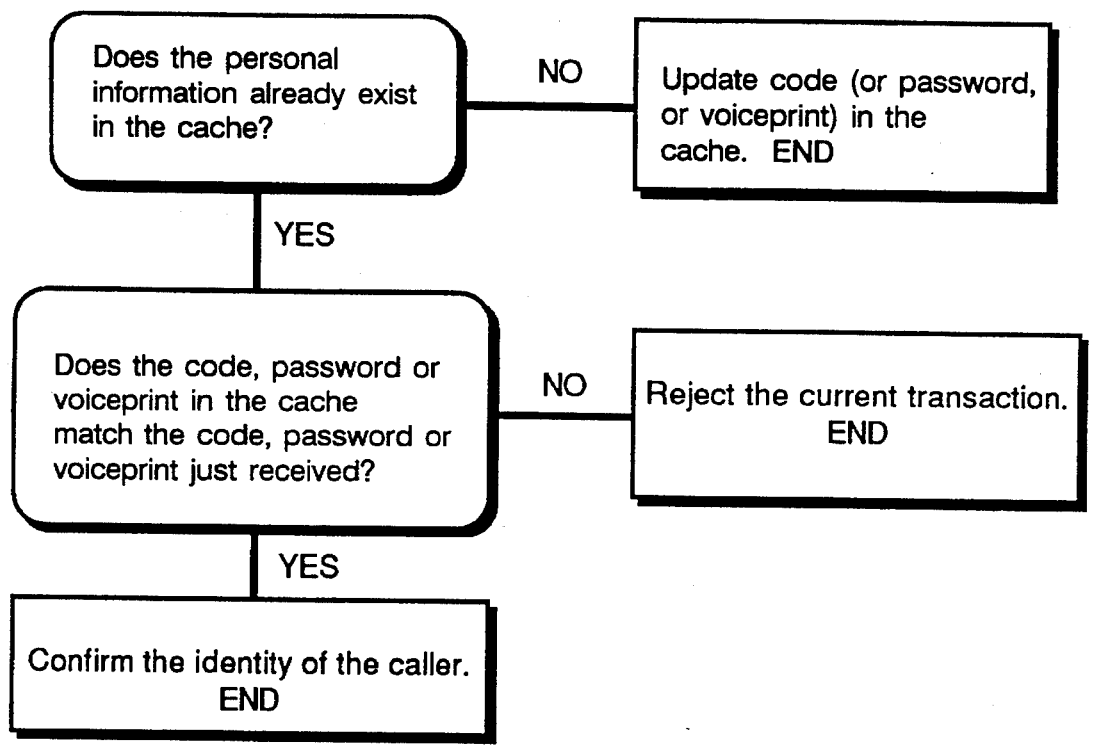
FIG. 7 is a flowchart diagram of a method of matching a code, password, or voice print with a code, password, or voice print that has been previously recorded.

Referring to FIG. 7, once the speaker verification unit at a remote station has produced a digitized and vectorized code or password or a voiceprint, the member processor transmits the caller identification information from the order entry computer either to the cache at the remote station or to the central station.

At this point, depending on whether the caller identification information is already stored in the cache at the remote station, the member processor either attempts to enroll new participants in the system and returns the results of the enrollment to the transaction database, or attempts to verify the identification of the caller and returns the results of the verification to the transaction database. Caller identity verification may be performed after the telephone call is terminated.

To begin the verification of the identity of the caller, the member processor receives from the cache or from the central database the code, password, or voiceprint that is associated with the caller identification information. The member processor transmits the code, password, or voiceprint to the speaker verification unit for the matching process.

The speaker verification unit matches the digitized and vectorized code or password or the voiceprint that it has produced against the digitized and vectorized code or password or the voiceprint received from the member processor, preferably by utilizing a dynamic time warping algorithm. The speaker verification unit produces a denial code if the degree of matching is in a range that is so low as to make it highly likely that the wrong code or password was used or that the person speaking was not an authorized person. The speaker verification unit produces a verification code if the degree of matching is within a range that is so high as to make it highly likely that the correct code or password was used or that the person speaking was the authorized person. The threshold of matching represented by the bottom of this range may vary in accordance with degree-of-matching data that the speaker verification unit receives from the order entry computer, the degree-of-matching data being dependent upon the value of the transaction that the caller wishes to make. The speaker verification unit produces a non-verification, non-denial code if the degree of matching is within a range that is not high enough to guarantee that the correct code or password was used or that the person speaking was the authorized person, but is high enough that the speaker verification unit cannot guarantee that an incorrect code or password was used or that the person speaking was an unauthorized person. The code produced by the speaker verification unit is inserted into the transaction database of the member processor at the remote station. The operators at the remote station can access the transaction database through the order entry computer.

In an alternative embodiment, the member processor is programmed to answer more complex questions about the strength of the order, using several factors to make the determination. For example, the processor might take into account the value of the order, the probability that the caller has correctly identified himself, information about shipping and billing addresses, and historical data related to the account, in determining an order strength index code that the member processor returns to the transaction database.

Figure 8A:
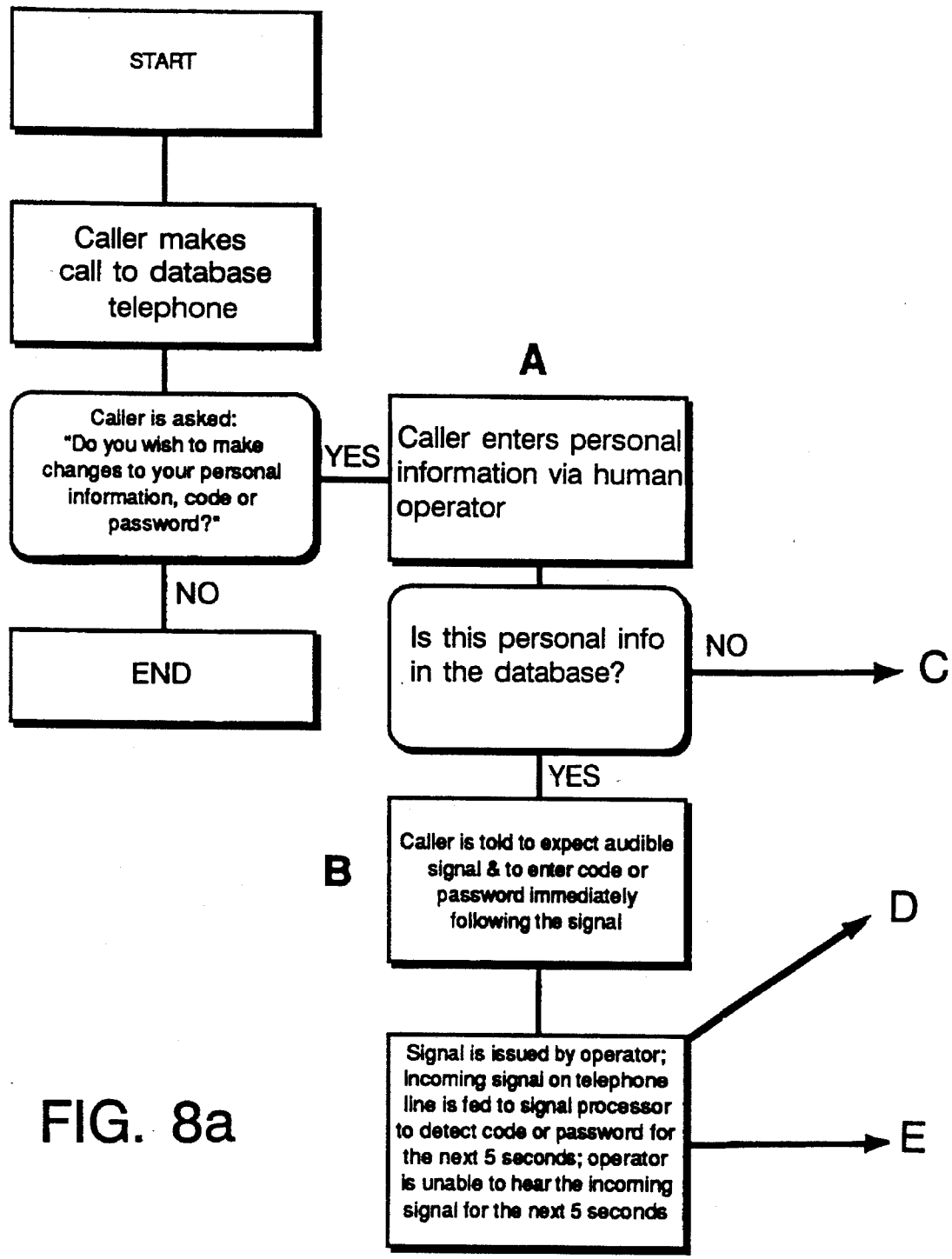
FIG. 8 is a flowchart diagram of a method according to the invention of updating caller identification information and a code or password.
Figure 8B:
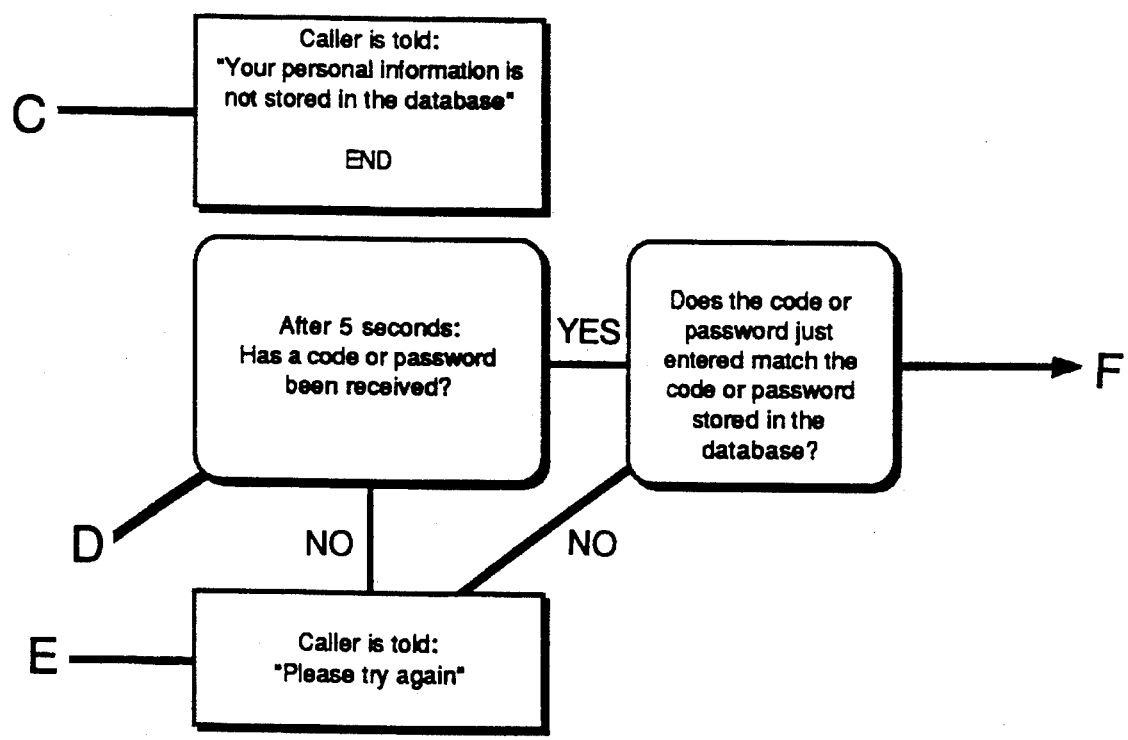
Figure 8C:
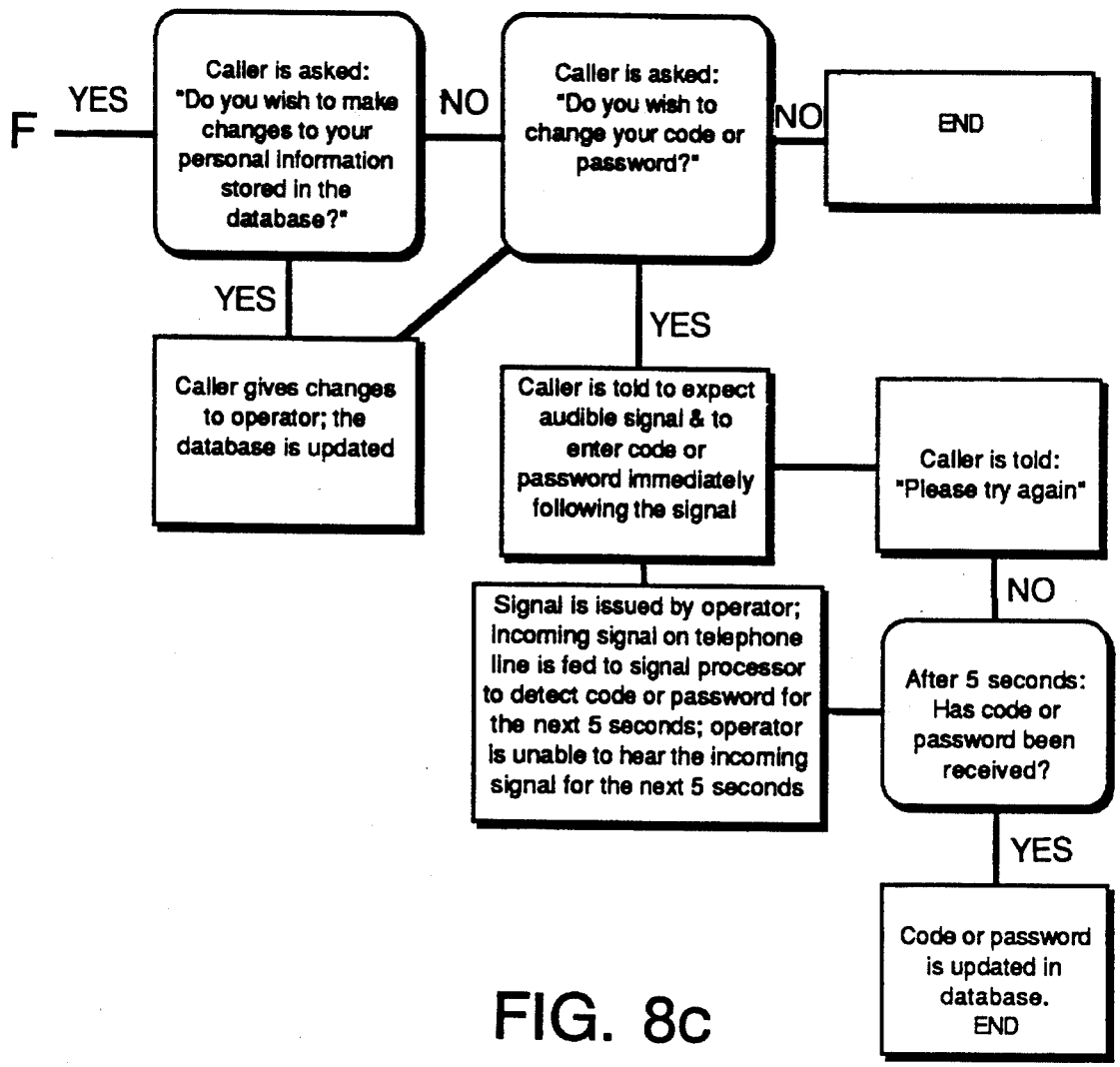

Referring to FIG. 8, when a caller telephones the central station to record changes to the caller identification information or to a code or password, the automatic call direction system transfers the call to a bank of operators, and the caller provides the operator with the original caller identification information and the original code or password. The speaker verification unit at the central station performs the matching process in order to confirm the identity of the caller. If the speaker verification unit confirms the identity of the caller, then the new caller identification information, or the new code or password, or both, are stored in the database.

Figure 9A:
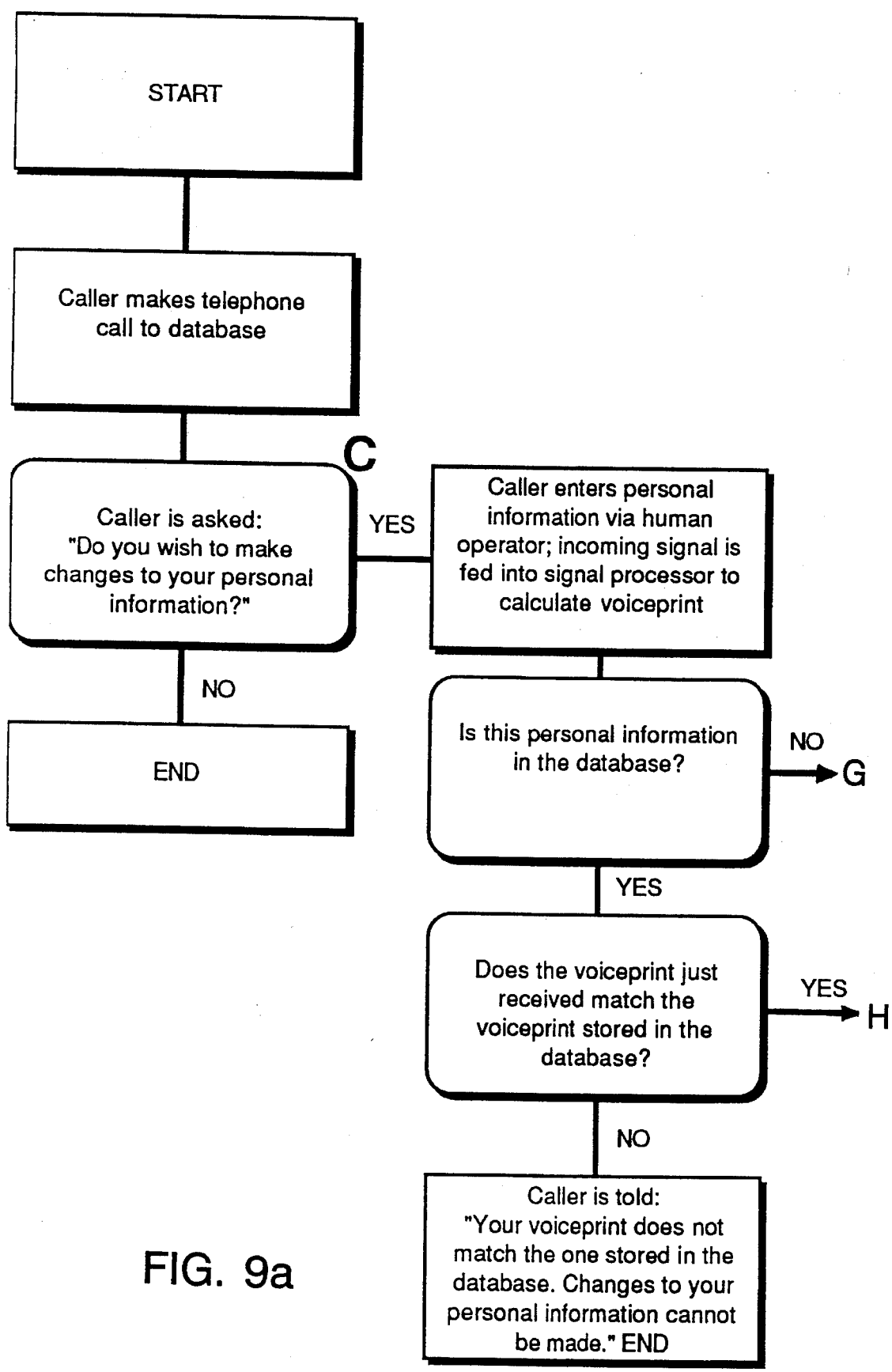
FIG. 9 is a flowchart diagram of a method according to the invention of updating caller identification information, in a system that records voice prints rather than codes or passwords.
Figure 9B:
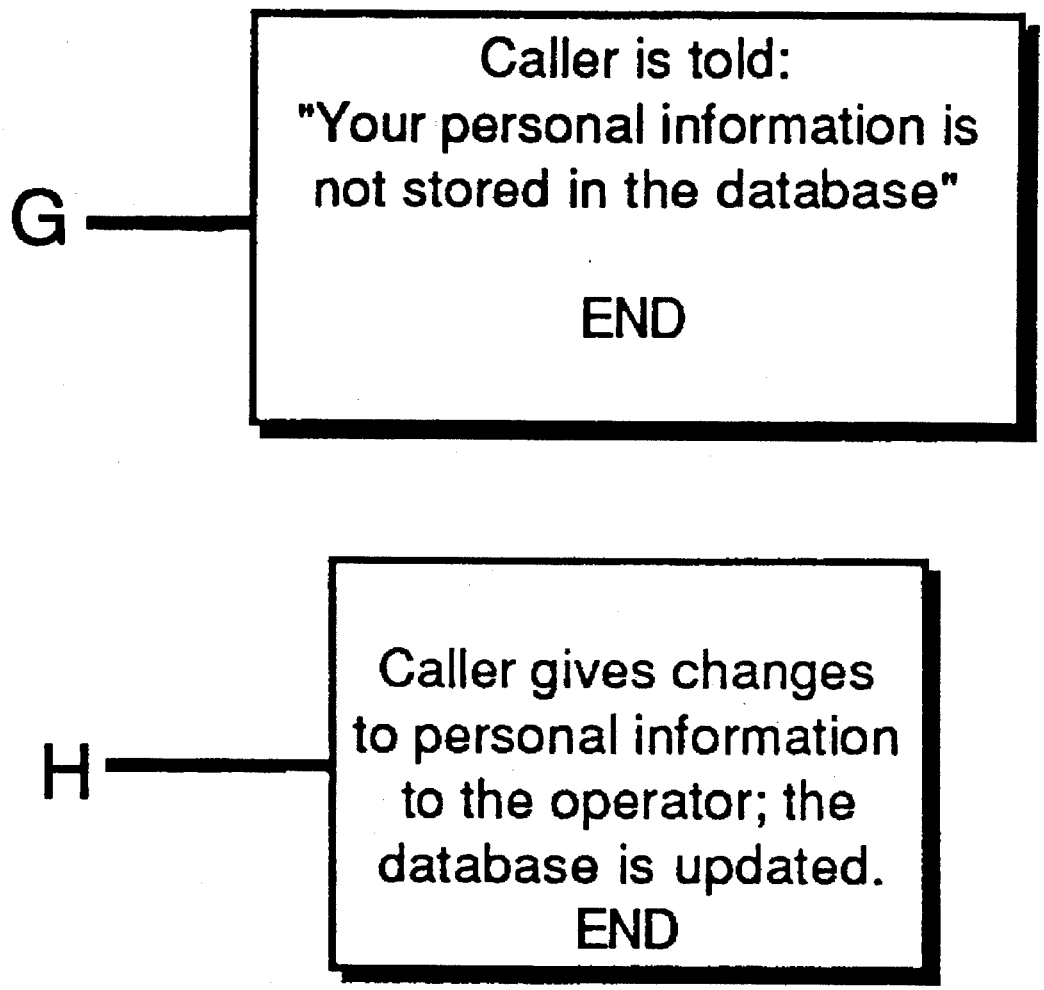

Referring to FIG. 9, when a caller telephones the central station to record changes to the caller identification information, in a system that uses voice prints rather than codes or passwords, the automatic call direction system transfers the call to a bank of operators, and the caller provides the operator with the original caller identification information. The speaker verification unit at the central station performs the voice print matching process in order to confirm the identity of the caller. If the speaker verification unit confirms the identity of the caller, then the new caller identification information is stored in the database.

Other embodiments are within the following claims.

What is claimed is:

1. A method for verifying whether a person speaking during a telephone call is one of a plurality of authorized users of a system, comprising prior to the telephone call, storing, at a first processing station, data corresponding to a valid signature and to caller identification information for each of said authorized users, said valid signature and said caller identification information being sufficient to identify said person as being one of said authorized users, receiving, via the public telephone system, at a second processing station, a telephone call comprising (i) a voice signal representing a signature of a possible user and (ii) a voice signal or a tone signal representing caller identification information for the possible user, digitally signal processing, using a digital data processing sytem located at the second station, the signals received at the second station, and based on signature data communicated via a telephone line from the first station to the second station either before the telephone call or after the telephone call, testing the signal presenting the signature of the possible user against the valid signature of the authorized user whose caller identification information corresponds to the caller identification information received at the second processing station and wherein the step of testing the signal representing the signature of the possible user against the valid signature comprises using the caller identification information, in a first protocol compatible with the digital data processing system located in the second station, and communicating with the first station via the telephone line between the first station and the second station in a second protocol compatible with the first station.

2. A method in accordance with claim 1, further comprising the steps of receiving, at the second station, data corresponding to a signature from the first station, and storing, in a signal cache at the second station, the data corresponding to the signature.

3. A method for verifying whether a person speaking during a telephone call is one of a plurality of authorized users of a system, comprising prior to the telephone call, storing, at a first processing station, data corresponding to a valid signature and to caller identification information for each of said authorized users, said valid signature and said caller identification information being sufficient to identify said person as being one of said users, receiving, via the public telephone system, at a second processing station, a telephone call comprising (i) a voice signal representing a signature of a possible user and (ii) a voice signal or a tone signal representing caller identification information for the possible user, digitally signal processing, at the second station, the signals received at the second station, based on signature data communicated via a telephone line from the first station to the second station either before the telephone call or after the telephone call, testing the signal representing the signature of the possible user against the valid signature of the authorized user whose caller identification information corresponds to the caller identification information received at the second processing station, causing data corresponding to the signal representing the signature of the possible user received at the second station to be stored in a signal cache at the second station for future reference, and receiving from the signal cache the data corresponding to the signal representing the signature of the possible user and transmitting the data corresponding to the signal representing the signature of the possible user to the first station to cause the data corresponding to the signal representing the signature of the possible user to be stored in the first station.

4. A method for verifying whether a person speaking during a telephone call is one of a plurality of authorized users of a system, comprising prior to the telephone call, storing, at a first processing station, data corresponding to a valid signature and to caller identification information for each of said authorized users, said valid signature and said caller identification information being sufficient to identify said person as being one of said authorized users, receiving, via the public telephone system, at a second processing station, a telephone call comprising (i) a voice signal representing a signature of a possible user and (ii) a voice signal or a tone signal representing caller identification information for the possible user, digitally signal processing, at the second station, the signals received at the second station, based on signature data communicated via a telephone line from the first station to the second station either before the telephone call or after the telephone call, testing the signal representing the signature of the possible user against the valid signature of the authorized user whose caller identification information corresponds to the caller identification information received at the second processing station, and confirming, at the second station, authorization of the possible user to engage in a subsequent transaction, the authorization being confirmed if and only if the signal representing the signature of the possible user matches the valid signature, wherein the subsequent transaction comprises recording a change to the data corresponding to the user's caller identification information.

5. A method in accordance with claim 4, wherein the step of confirming the authorization comprises storing an authorization signal in a transaction database at the second station.

6. A method in accordance with claim 4, wherein the subsequent transaction comprises a financial transaction.

7. A method in accordance with claim 4, wherein the subsequent transaction comprises recording a change to the data corresponding to the user's valid signature.

8. A method for verifying whether a person speaking during a telephone call is one of a plurality of authorized users of a system, comprising prior to the telephone call, storing, at a first processing station, data corresponding to a valid signature and to caller identification information for each of said authorized users, said valid signature and said caller identification information being sufficient to identify said person as being one of said authorized users, receiving, via the public telephone system, at a second processing station, a telephone call comprising (i) a voice signal representing a signature of a possible user and (ii) a voice signal or a tone signal representing caller identification information for the possible user, digitally signal processing, at the second station, the signals received at the second station, based on signature data communicated via a telephone line from the first station to the second station either before the telephone call or after the telephone call, testing the signal representing the signature of the possible user against the valid signature of the authorized user whose caller identification information corresponds to the caller identification information received at the second processing station, storing, at the second station, a value indicating a level of matching between the signal representing the signature of the possible user and the valid signature, and reporting whether the signal representing the signature of the possible user matches the valid signature to the level necessary to establish a match.

9. A method in accordance with claim 8 wherein the signal representing the signature comprises a spoken password.

10. A method in accordance with claim 8, wherein the step of digitally signal processing the signal representing the signature comprises digitizing the signal and extracting a block of voice print data characteristic of a voice print of the possible user.

11. A method in accordance with claim 8, further comprising the steps of receiving, via the public telephone system, at a plurality of second stations, respective telephone calls each comprising signals representing (i) a voice signal representing a signature of a possible user and (ii) a voice signal or a tone signal representing caller identification information for the possible user, digitally signal processing, at each of the plurality of second stations, the signals received at each of the plurality of second stations, and based on signature data communicated via a plurality of telephone lines from the first station to respective ones of the plurality of second stations either before or after the respective telephone calls, testing the signal representing the signature of the possible user against the valid signature of the authorized user whose caller identification information corresponds to the caller identification information sent from the first station and received at the respective second stations.

12. A method in accordance with claim 8, wherein the signal representing the signature of the possible user is distinct from the signal representing the caller identification information.

13. A method in accordance with claim 8, wherein the caller identification information identifies an account of the user.

14. A method in accordance with claim 8, further comprising the step of directing the signal representing the signature to a speaker verification unit in a manner such that the signal representing the signature is isolated from access by other persons, the speaker verification unit performing the step of digital signal processing the signal representing the signature.

15. A method in accordance with claim 8 wherein the step of testing the signal representing the signature of the possible user against the valid signature comprises communicating with a digital data processing system at the first station, the digital data processing system comprising a database in which data corresponding to the valid signatures and to the caller identification information is stored.

16. A method in accordance with claim 8, further comprising the step of reporting, at the second station, whether the signal representing the signature of the possible user mismatches the valid signature to a level necessary to establish a mismatch, and whether the signal representing the signature of the possible user matches the valid signature to a level insufficient to establish a match but also insufficient to establish a mismatch.

17. An information processing system for verifying whether a person speaking during a telephone call is one of a plurality of authorized users of the system, comprising a first processing station, arranged for storing, prior to the call, data corresponding to a valid signature and to caller identification information for each of said authorized users, said valid signature and said caller identification information being sufficient to identify said person as being one of said authorized users, and a second processing station located at a remote location, the second station comprising a speaker verification unit, adapted for receiving, via the public telephone system, a telephone call comprising a voice signal representing a signature of a possible user, and for digitally signal processing the voice signal representing the signature, and a processor, connected to the speaker verification unit and adapted for connection to the first station via a telephone line between the first station and the second station, programmed to receive caller identification information for the possible user and to receive a digitally processed signature signal for the possible user from the speaker verification unit, and programmed to participate in a communication of signature data via a telephone line from the first station to the second station either before the telephone call or after the telephone call, in order to permit the signature signal for the possible user to be tested against the valid signature of the authorized user whose caller identification information corresponds to the caller identification information received at the processor, wherein the processor is programmed to cause a digitally processed signal representing the signature of the possible user and produced by the speaker verification unit to be stored in the first station for future reference, and wherein:

the processor comprises a signal cache, the processor is programmed to cause the digitally processed signal representing the signature of the possible user and produced by the speaker verification unit to be stored in the signal cache for future reference, and the processor is programmed to receive from the signal cache the digitally processed signal representing the signature of the possible user and to transmit the digitally processed signal representing the signature of the possible user to the first station to cause the digitally processed signal representing the signature of the possible user to be stored in the first station for future reference.

18. An information processing system for verifying whether a person speaking during a telephone call is one of a plurality of authorized users of the system, comprising a first processing station, arranged for storing, prior to the call, data corresponding to a valid signature and to caller identification information for each of said authorized users, said valid signature and said caller identification information being sufficent to identify said person as being one of said authorized users, and a second processing station located at a remote location, the second station comprising a speaker verification unit, adapted for receiving, via the public telephone system, a telephone call comprising a voice signal representing a signature of a possible user and for digitally signal processing the signal representing the signature, and a processor, connected to the speaker verification unit and adapted for connection to the first station via a telephone line between the first station and the second station, programmed to receive caller identification information for the possible user and to receive a digitally processed signature signal for the possible user from the speaker verification unit, and programmed to participate in a communication of signature data via a telephone line from the first station to the second station either before the telephone call or after the telephone call, in order to permit the signature signal for the possible user to be tested against the valid signature of the authorized user whose caller identification information corresponds to the caller identification information received at the processor, wherein the processor is programmed to confirm authorization of the possible user to engage in a subsequent transaction, the authorization being confirmed if and only if the signal representing the signature of the possible user matches the valid signature, and wherein the subsequent transaction comprises recording a change to the data corresponding to the user's caller identification information.

19. An information processing system for verifying whether a person speaking during a telephone call is one of a plurality of authorized users of the system, comprising a first processing station, arranged for storing, prior to the call, data corresponding to a valid signature and to caller identification information for each of said authorized users, said valid signature and said caller identification information being sufficient to identify said person as being one of said authorized users, and a second processing station located at a remote location, the second station comprising a speaker verification unit, adapted for receiving, via the public telephone system, a telephone call comprising a voice signal representing a signature of a possible user and for digitally signal processing the signal representing the signature, and a processor, connected to the speaker verification unit and adapted for connection to the first station via a telephone line between the first station and the second station, programmed to receive caller identification information for the possible user and to receive a digitally processed signature signal for the possible user from the speaker verification unit, and programmed to participate in a communication of signature data via a telephone line from the first station to the second station either before the telephone call or after the telephone call, in order to permit the signature signal for the possible user to be tested against the valid signature of the authorized user whose caller identification information corresponds to the caller identification information received at the processor, wherein the processor is programmed to confirm authorization of the possible user to engage in a subsequent transaction, the authorization being confirmed if and only if the signal representing the signature of the possible user matches the valid signature, and wherein the subsequent transaction comprises recording a change to the data corresponding to the user's valid signature.

20. A system in accordance with claim 19, wherein the signal representing the signature comprises a spoken password.

21. A system in accordance with claim 19, wherein the signal representing the signature comprises human speech, and the speaker verification unit comprises digitization circuitry arranged to digitize the signal representing the signature and voice print extraction circuitry arranged to extract, from a digitized signal produced by the digitization circuitry, a block of voice print data characteristic of a voice print of the possible user.

22. A system in accordance with claim 19, comprising a plurality of second processing stations located at differing remote locations, each second station comprising a speaker verification unit, adapted for receiving, via the public telephone system, a telephone call comprising a signal representing a signature of a possible user wherein the signal is comprised of a voice signal or a tone signal and for digitally signal processing the signal representing the signature, and a processor, connected to the speaker verification unit and adapted for connection to the first station via one of a plurality of telephone lines between the first station and respective ones of the plurality of second stations, programmed to receive caller identification information for the possible user and to receive a digitally processed signature signal for the possible user from the speaker verification unit, and programmed to participate in a communication of signature data via a telephone line from the first station to the second station either before or after the telephone call in order to permit the signal representing the signature of the possible user to be tested against the valid signature of the authorized user whose caller identification information corresponds to the caller identification information sent from the first station and, received at the processor.

23. A system in accordance with claim 19, wherein the signal representing the signature of the possible user is distinct from the signal representing the caller identification information.

24. A system in accordance with claim 19, wherein the caller identification information identifies an account of the user.

25. A system in accordance with claim 19, wherein the second station further comprises an automatic call direction unit adapted to direct the signal representing the signature of the possible user to the speaker verification unit.

26. A system in accordance with claim 25, wherein the automatic call direction unit is adapted to direct the signal representing the signature to the speaker verification unit in a manner such that the signal is isolated from access by other persons.

27. A system in accordance with claim 19, wherein the processor located at the second station is programmed to using the caller identification information in a first protocol compatible with the digital data processing system located at the second station, and to communicate with the first station via the telephone line between the first station and second station in a second protocol compatible with the first station.

28. A system in accordance with claim 19, wherein the processor communicates with the first station by communicating with a digital data processing system at the first station, the digital data processing system comprising a database in which the data corresponding to the valid signatures and to the caller identification information is stored.

29. An information processing system for verifying whether a person speaking during a telephone call is one of a plurality of authorized users of the system, comprising a first processing station, arranged for storing, prior to the call, data corresponding to a valid signature and to caller identification information for each of said authorized users, said valid signature and said caller identification information being sufficent to indentify each of said authorized users as being an authorized user, and a second processing station located at a remote location, the second station comprising a speaker verification unit, adapted for receiving, via the public telephone system, a telephone call comprising a signal representing a signature of a possible user wherein the signal representing the signature comprises a voice signal or a tone signal, and for digitally signal processing the signal representing the signature, and a processor, connected to the speaker verification unit and adapted for connection to the first station via a telephone line between the first station and the second station, programmed to receive caller identification information for the possible user and to receive a digitally processed signature signal for the possible user from the speaker verification unit, and programmed to participate in a communication of signature data via a telephone line from the first station to the second station either before the telephone call or after the telephone call, in order to permit the signature signal for the possible user to be tested against the valid signature of the authorized user whose caller identification information corresponds to the caller identification information received at the processor, and wherein the subsequent transaction comprises recording a change to the data corresponding to the user's caller identification information.

30. A system in accordance with claim 29, wherein the second station is programmed to report whether the signal representing the signature of the possible user mismatches the valid signature to a level necessary to establish a mismatch, and whether the signal representing the signature of the possible user matches the valid signature a level insufficient to establish a match but also insufficient to establish a mismatch.

31. A signal processing station for processing information, comprising a speaker verification unit, adapted for receiving, via the public telephone system, a telephone call from a possible user comprising a signal representing a signature of the possible user wherein the signal is comprised of a voice signal or a tone signal, and for digitally signal processing the signal representing the signature, and a processor, adapted for connection to the speaker verification unit, and adapted for connection to a database station via a telephone line between the signal processing station and the database station, the database station being arranged for storing data corresponding to a valid signature and to caller identification information for respective users, the processor being programmed to receive caller identification information for the possible user and to receive a digitally processed signature signal for the possible user from the speaker verification unit, and programmed to participate in a communication of signature data via a telephone line from the first station to the second station either before the telephone call or after the telephone call, in order to permit the signature of the possible user to be tested against the valid signature of the authorized user whose caller identification information corresponds to the caller identification information received at the processor, wherein the processor is programmed to confirm authorization of the possible user to engage in a subsequent transaction, the authorization being confirmed if and only if the signal representing the signature of the possible user matches the valid signature, and wherein the subsequent transaction comprises recording a change to the data corresponding to the user's caller identification information.

32. A signal processing station for processing information, comprising a speaker verification unit, adapted for receiving, via the public telephone system, a telephone call from a possible user comprising a signal representing a signature of the possible user wherein the signal is comprised of a voice signal or a tone signal, and for digitally signal processing the signal representing the signature, and a processor, adapted for connection to the speaker verification unit, and adapted for connection to a database station via a telephone line between the signal processing station and the database station, the database station being arranged for storing data corresponding to a valid signature and to caller identification information for respective users, the processor being programmed to receive caller identification information for the possible user and to receive a digitally processed signature signal for the possible user from the speaker verification unit, and programmed to participate in a communication of signature data via a telephone line from the first station to the second station either before the telephone call or after the telephone call, in order to permit the signature of the possible user to be tested against the valid signature of the authorized user whose caller identification information corresponds to the caller identification information received at the processor, wherein the processor is programmed to confirm authorization of the possible user to engage in a subsequent transaction, the authorization being confirmed if and only if the signal representing the signature of the possible user matches the valid signature, and wherein the subsequent transaction comprises recording a change to the data corresponding to the user's valid signature.

33. A signal processing station in accordance with claim 32, wherein the signal representing the signature comprises human speech, and the speaker verification unit comprises digitization circuitry arranged to digitize the signal representing the signature and voice print extraction circuitry arranged to extract, from a digitized signal produced by the digitization circuitry, a block of voice print data characteristic of a voice print of the possible user.

34. A signal processing station in accordance with claim 32, wherein the signal representing the signature of the possible user is distinct from the signal representing the caller identification information.

35. A signal processing station in accordance with claim 32, wherein the caller identification information identifies an account of the user.

36. A signal processing station in accordance with claim 32, further comprising an automatic call direction unit adapted to direct the signal representing the signature of the possible user to the speaker verification unit.

37. A signal processing station in accordance with claim 36, wherein the automatic call direction unit is adapted to direct the signal representing the signature to the speaker verification unit in a manner such that the signal is isolated from access by other persons.

38. A signal processing station in accordance with claim 32, wherein the processor is programmed to using the caller identification information in a first protocol compatible with the digital data processing system, and to communicate with the database station via the telephone line between the database station and the signal processing station in a second protocol compatible with the database station.

39. A signal processing station in accordance with claim 32, wherein the processor comprises a signal cache, and the processor is programmed to receive data from the database station corresponding to a signature, and to store the data corresponding to the signature in the signal cache.

40. A signal processing station in accordance with claim 32, wherein the processor is programmed to cause a digitally processed signal representing the signature of the possible user and produced by the speaker verification unit to be stored in the first station for future reference.

41. A signal processing station in accordance with claim 40, wherein the processor comprises a signal cache, the processor is programmed to cause the digitally processed signal representing the signature of the possible user and produced by the speaker verification unit to be stored in the signal cache for future reference, and the processor is programmed to receive from the signal cache the digitally processed signal representing the signature of the possible user and to transmit the digitally processed signal representing the signature of the possible user to the database station to cause the digitally processed signal representing the signature of the possible user to be stored in the database station for future reference.

42. A signal processing station in accordance with claim 32, wherein the processor communicates with the database station by communicating with a digital data processing system at the database station, the digital data processing system comprising a database in which the data corresponding to valid signatures and to the caller identification information is stored.

43. A signal processing station for processing information, comprising a speaker verification unit, adapted for receiving, via the public telephone system, a telephone call from a possible user comprising a signal representing a signature of the possible user wherein the signal is comprised of a voice signal or a tone signal, and for digitally signal processing the signal representing the signature, and a processor, adapted for connection to the speaker verification unit, and adapted for connection to a database station via a telephone line between the signal processing station and the database station, the database station being arranged for storing data corresponding to a valid signature and to caller identification information for respective users, the processor being programmed to receive caller identification information for the possible user and to receive a digitally processed signature signal for the possible user from the speaker verification unit, and programmed to participate in a communication of signature data via a telephone line from the first station to the second station either before the telephone call or after the telephone call, in order to permit the signature of the possible user to be tested against the valid signature of the authorized user whose caller identification information corresponds to the caller identification information received at the processor, and wherein the signal processing station is programmed to store a value indicating a level of matching between the signal representing the signature of the possible user and the valid signature, and to report whether the signal representing the signature of the possible user matches the valid signature to the level necessary to establish a match.

44. A signal processing station in accordance with claim 43, wherein the signal processing station is programmed to report whether the signal representing the signature of the possible user mismatches the valid signature to a level necessary to establish a mismatch, and whether the signal representing the signature of the possible user matches the valid signature to a level insufficient to establish a match but also insufficient to establish a mismatch.

45. A system in accordance with claim 19, wherein the processor comprises a transaction database, and the processor confirms the authorization by storing an authorization signal in the transaction database.

46. A system in accordance with claim 19, wherein the subsequent transaction comprises a financial transaction.

47. A signal processing station in accordance with claim 32, wherein the processor comprises a transaction database, and the processor confirms the authorization by storing an authorization signal in the transaction database.

48. A signal processing station in accordance with claim 32, wherein the subsequent transaction comprises a financial transaction.

* * * * *

UNITED STATES PATENT AND TRADEMARK OFFICE
CERTIFICATE OF CORRECTION

PATENT NO. : 5,465,290

DATED : November 7, 1995

INVENTOR(S) : Thomas H. Hampton et al.

It is certified that error appears in the above-identified patent and that said Letters Patent is hereby corrected as shown below:

```
In Col. 4, delete lines 1-2, and insert:

--DRAWINGS

FIG. 1 is a block diagram of a security
     system according to the invention.--

In Col. 15, line 58, "indentify" should be
--identify--.

In Col. 16, line 26, after "signature" insert --to--.
```

Signed and Sealed this

Twelfth Day of November, 1996

*Attest:*

BRUCE LEHMAN

*Attesting Officer*    *Commissioner of Patents and Trademarks*